(12) United States Patent
Fu et al.

(10) Patent No.: US 9,641,863 B2
(45) Date of Patent: May 2, 2017

(54) APPARATUS AND METHOD OF SAMPLE ADAPTIVE OFFSET FOR VIDEO CODING

(71) Applicant: HFI Innovation Inc., Zhubei, Hsinchu County (TW)

(72) Inventors: Chih-Ming Fu, Hsinchu (TW); Ching-Yeh Chen, Taipei (TW); Chia-Yang Tsai, New Taipei (TW); Yu-Wen Huang, Taipei (TW); Shaw-Min Lei, Hsinchu County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 176 days.

(21) Appl. No.: 14/598,638

(22) Filed: Jan. 16, 2015

(65) Prior Publication Data

US 2015/0124869 A1 May 7, 2015

Related U.S. Application Data

(60) Division of application No. 13/158,427, filed on Jun. 12, 2011, now Pat. No. 9,055,305, and a
(Continued)

(51) Int. Cl.
*H04N 19/167* (2014.01)
*H04N 19/117* (2014.01)
(Continued)

(52) U.S. Cl.
CPC .......... *H04N 19/61* (2014.11); *H04N 19/117* (2014.11); *H04N 19/119* (2014.11); *H04N 19/14* (2014.11);
(Continued)

(58) Field of Classification Search
CPC ...... H04N 19/61; H04N 19/439; H04N 19/85; H04N 19/167; H04N 19/182; H04N 19/70;
(Continued)

(56) References Cited

U.S. PATENT DOCUMENTS 5,930,394 A * 7/1999 Kondo ................. H04N 19/647
375/E7.049
6,084,908 A * 7/2000 Chiang .................... G06T 7/20
348/E5.066
(Continued)

FOREIGN PATENT DOCUMENTS

CN 1753500 3/2006
CN 101568033 A 10/2009
(Continued)

OTHER PUBLICATIONS

McCann et al. "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, DE, Apr. 15-23, 2010.
(Continued)

*Primary Examiner* — Neil Mikeska
(74) *Attorney, Agent, or Firm* — McClure, Qualey & Rodack, LLP

(57) ABSTRACT

An apparatus and method for sample adaptive offset (SAO) to restore intensity shift of processed video data are disclosed. In an encoder side, the processed video data corresponding to reconstructed video data, deblocked-reconstructed video data, or adaptive loop filtered and deblocked-reconstructed video data are partitioned into regions smaller than a picture. The region partition information is signaled in a video bitstream located in a position before intensity offset values syntax. At the decoder side, the processed video data is partitioned into regions according to the partition information parsed from the bitstream at a position before intensity offset values syntax. Region-based SAO is applied to each region based on the intensity offset for the category of the region-based SAO type selected.

15 Claims, 17 Drawing Sheets

Related U.S. Application Data continuation-in-part of application No. 12/987,151, filed on Jan. 9, 2011, now Pat. No. 8,660,174.

(60) Provisional application No. 61/432,482, filed on Jan. 13, 2011, provisional application No. 61/436,296, filed on Jan. 26, 2011, provisional application No. 61/466,083, filed on Mar. 22, 2011.

(51) Int. Cl.
| | |
|---|---|
| *H04N 19/182* | (2014.01) |
| *H04N 19/61* | (2014.01) |
| *H04N 19/82* | (2014.01) |
| *H04N 19/85* | (2014.01) |
| *H04N 19/70* | (2014.01) |
| *H04N 19/119* | (2014.01) |
| *H04N 19/162* | (2014.01) |
| *H04N 19/174* | (2014.01) |
| *H04N 19/192* | (2014.01) |
| *H04N 19/96* | (2014.01) |
| *H04N 19/14* | (2014.01) |
| *H04N 19/179* | (2014.01) |
| *H04N 19/42* | (2014.01) |

(52) U.S. Cl.
CPC ......... *H04N 19/162* (2014.11); *H04N 19/167* (2014.11); *H04N 19/174* (2014.11); *H04N 19/179* (2014.11); *H04N 19/182* (2014.11); *H04N 19/192* (2014.11); *H04N 19/439* (2014.11); *H04N 19/70* (2014.11); *H04N 19/82* (2014.11); *H04N 19/85* (2014.11); *H04N 19/96* (2014.11)

(58) Field of Classification Search
CPC .. H04N 19/119; H04N 19/117; H04N 19/162; H04N 19/174; H04N 19/192; H04N 19/96; H04N 19/14; H04N 19/179; H04N 19/82
See application file for complete search history.

(56) References Cited

U.S. PATENT DOCUMENTS

| | | | |
|---|---|---|---|
| 8,195,001 B2 | 6/2012 | Chiu et al. | |
| 8,406,286 B2 | 3/2013 | Liu et al. | |
| 2003/0219073 A1* | 11/2003 | Lee | H04N 19/176 375/240.27 |
| 2006/0013310 A1 | 1/2006 | Lee et al. | |
| 2007/0098076 A1 | 5/2007 | Sun et al. | |
| 2008/0084932 A1* | 4/2008 | Wang | H04N 19/176 375/240.24 |
| 2009/0003720 A1* | 1/2009 | Sun | H04N 1/41 382/254 |
| 2009/0257664 A1* | 10/2009 | Kao | H04N 19/159 382/232 |
| 2009/0257670 A1 | 10/2009 | Chiu et al. | |
| 2013/0301732 A1* | 11/2013 | Hsu | H04N 19/136 375/240.16 |

FOREIGN PATENT DOCUMENTS

| | | |
|---|---|---|
| CN | 101640802 | 2/2010 |
| CN | 101790092 | 7/2010 |
| WO | WO 03/103289 | 12/2003 |
| WO | WO 2004/054270 | 6/2004 |
| WO | WO 2007/081176 | 7/2007 |
| WO | WO 2007/081713 | 7/2007 |
| WO | WO 2007/081908 | 7/2007 |
| WO | WO 2009/015553 | 2/2009 |
| WO | WO 2010/123855 | 10/2010 |
| WO | WO 2010/123862 | 10/2010 |

OTHER PUBLICATIONS

Chih-Ming Fu, "CE8 Subset3: Picture Quadtree Adaptive Offset", Document: JCTVC-D122, Joint Collaborative Team on Video Coding (JCT-VC) of ITU-T SG16 WP3 and ISO/IEC JTC1/SC29/WG11, 4th Meeting: Daegu, KR, Jan. 20-28, 2011.

Chih-Ming Fu, "CE13: Sample Adaptive Offset with LCU-Independent Decoding", Document: JCTVC-E049, Joint Collaborative Team on Video Coding (JCT-VC) of ITU-T SG16 WP3 and ISO/IEC JTC1/SC29/WG11, 5th Meeting: Geneva, CH, Mar. 16-23, 2011.

McCann, K., et al.; "HM3 High Efficiency Video Coding (HEVC) Test Model 3 Encoder Description;" Joint Collaborative Team on Video Coding (JCT-VC) of ITU-T SG16 WP3 and ISO/IEC JTC1/SC29/WG11; Mar. 2011; pp. 1-34.

Huang, Y.W., et al.; "In-Loop Adaptive Restoration;" Joint Collaborative Team on Video Coding (JCT-VC) of ITU-T SG16 WP3 and ISO/IEC JTC1/SC29/WG11; Jul. 2010; pp. 1-11.

Fu, C.M., et al.; "TE10 Subtest 3 Quadtree-based Adaptive Offset;" Joint Collaborative Team on Video Coding (JCT-VC) of ITU-T SG16 WP3 and ISO/IEC JTC1/SC29/WG11; Oct. 2010; pp. 1-6.

Vellaikal, A., et al.; "Joint Spatial-Spectral Indexing for Image Retrieval" IEEE; 1996; pp. 867-870.

Tsai, C.Y., et al.; "TE10 Subtest2: Coding Unit Synchronous Picture Quadtree-based Adaptive Loop Filter;" Joint Collaborative Team on Video Coding (JCT-VC) of ITU-T SG 16 WP3 and ISO/IEC JTC1/SC29/WG11; Oct. 2010; pp. 1-12.

McCann, K., et al.; "Samsung and BBC response to Call for Proposals on Video Compression Technology;" Apr. 2010; pp. 1-36.

Lopez, J., et al.; "Block-Based Illumination Compensation and Search Techniques for Multiview Video Coding;" Dec. 2004; pp. 1-6.

Shen, Y., et al.; "Adaptive weighted prediction in video coding;" IEEE International Conference on Multimedia and Expo; Jun. 2004; pp. 427-430.

McCann, et al.: Samsung's Response to the Call for Proposals on Video Compression Technology; Joint Collaborative Team on Video Coding (JCT-VC) of ITU-T SG16 WP3 and ISO/IEC JTC1/SC29/WG11; 1st Meeting: Dresden, DE, Apr. 15-23, 2010; Document JCTVC-AI24; pp. 1-53.

* cited by examiner

| seq_parameter_set_rbsp( ) { | Descriptor |
|---|---|
| ... | |
| sample_adaptive_offset_enabled_flag | u(1) |
| ... | |
| } | |

*Fig. 14*

| slice_header( ) { | Descriptor |
|---|---|
| ... | |
| if( sample_adaptive_offset_enabled_flag ){ | |
| sao_param() | |
| } | |
| ... | |
| } | |

*Fig. 15*

| sao_param() { | C | Descriptor |
|---|---|---|
| sample_adaptive_offset_flag | 2 | u(1) |
| if (sample_adaptive_offset_flag ) { | | |
| sao_split_param( 0, 0, 0) | | |
| sao_offset_param( 0, 0, 0) | | |
| } | | |
| } | | |

*Fig. 16*

| sao_split_param( xs, ys, sao_curr_depth ) { | C | Descriptor |
|---|---|---|
| if (sao_curr_depth < SaoMaxDepth ) { | | |
| sao_split_flag [ sao_curr_depth ][ ys ][ xs ] | 2 | u(1) |
| } else { | | |
| sao_split_flag [ sao_curr_depth ][ ys ][ xs ] = 0 | | |
| } | | |
| If (sao_split_flag [ sao_curr_depth ][ ys ][ xs ]) { | | |
| sao_split_param ( xs + 0, ys + 0, sao_curr_depth + 1 ) | | |
| sao_split_param ( xs + 1, ys + 0, sao_curr_depth + 1 ) | | |
| sao_split_param ( xs + 0, ys + 1, sao_curr_depth + 1 ) | | |
| sao_split_param ( xs + 1, ys + 1, sao_curr_depth + 1 ) | | |
| } | | |
| } | | |

*Fig. 17*

| sao_offset_param( xs, ys, sao_curr_depth ) { | C | Descriptor |
|---|---|---|
| if (sao_split_flag [ sao_curr_depth ][ ys ][ xs ]) { | | |
| sao_offset_param( xs + 0, ys + 0, sao_curr_depth + 1 ) | | |
| sao_offset_param( xs + 1, ys + 0, sao_curr_depth + 1 ) | | |
| sao_offset_param( xs + 0, ys + 1, sao_curr_depth + 1 ) | | |
| sao_offset_param( xs + 1, ys + 1, sao_curr_depth + 1 ) | | |
| } else { | | |
| sao_type_idx [ sao_curr_depth ][ ys ][ xs ] | 2 | ue(v) |
| curr_num = sao_offset_num [sao_type_idx [ sao_curr_depth ][ ys ][ xs ]] | | |
| if ( sao_type_idx [ sao_curr_depth ][ ys ][ xs ] != 0 ) { | | |
| for ( i = 0; i < curr_num; i++ ) { | | |
| sao_offset [ sao_curr_depth ][ ys ][ xs ][ i ] | 2 | se(v) |
| } | | |
| } | | |
| } | | |
| } | | |

*Fig. 18*

APPARATUS AND METHOD OF SAMPLE ADAPTIVE OFFSET FOR VIDEO CODING

CROSS REFERENCE TO RELATED APPLICATIONS

The present invention is a divisional of U.S. Non-Provisional patent application Ser. No. 13/158,427, filed on Jun. 12, 2011, which claims priority to U.S. Provisional Patent Application No. 61/432,482, filed Jan. 13, 2011, entitled "Picture Quadtree Adaptive Offset", U.S. Provisional Patent Application, No. 61/436,296, filed Jan. 26, 2011, entitled "Improved Offset Method", U.S. Provisional Patent Application, No. 61/466,083, filed Mar. 22, 2011, entitled "Sample Adaptive Offset", and U.S. Non-Provisional patent application, Ser. No. 12/987,151, entitled "Apparatus and Method of Adaptive Offset for Video Coding", filed on Jan. 9, 2011. The U.S. Provisional Patent Applications and U.S. Non-Provisional Patent Application are hereby incorporated by reference in their entireties.

FIELD OF THE INVENTION

The present invention relates to video processing. In particular, the present invention relates to apparatus and method for sample adaptive offset compensation.

BACKGROUND

In a video coding system, the video data are subject to various processing such as prediction, transform, quantization, deblocking, and adaptive loop filtering. Along the processing path in the video coding system, certain characteristics of the processed video data may be altered from the original video data due to the operations applied to video data. For example, the mean value of the processed video may be shifted. Intensity shift may cause visual impairment or artifacts, which is especially more noticeable when the intensity shift varies from frame to frame. Therefore, the pixel intensity shift has to be carefully compensated or restored to alleviate the artifacts. Some intensity offset schemes have been used in the field. The intensity offset scheme usually classifies each pixel in the processed video data into one of multiple categories according to a context selected. For example, the context may be the pixel intensity of the processed video data. Alternatively, the context may be a combination of a current pixel and its surrounding pixels. A characteristic measurement is derived according to the selected context and a category is determined according to the measured characteristic. For each category, intensity shift between the original pixels and the processed pixels is determined. The intensity shift is also called the "offset value" in this disclosure. Accordingly, the offset value is applied to the processed pixels belonging to the category to compensate the intensity shift. The process of intensity shift compensation or restoration for processed video data based on the category of each pixel is termed "sample adaptive offset (SAO)" in this disclosure.

The conventional SAO scheme often determines the category for the pixels on a frame by frame or slice by slice basis. However, picture contents often are dynamic and the characteristic may vary from frame to frame and/or from region to region within a frame. Therefore, it is desirable to develop a sample adaptive offset scheme that can take into consideration of the dynamic characteristics within a frame using a region partition scheme to adaptively partition the processed video data into regions having different sizes. Furthermore, the conventional SAO scheme always uses a fixed context to determine a category for the pixel of processed video data. For example, the SAO may only use a fixed 16-band band offset (BO) for sample adaptive offset. In another example, the SAO may only used a 3×3 window as the context to determine the category for the pixel of processed video data. It is desirable that the sample adaptive offset scheme can adaptively select a SAO type from a group of SAO types to tailor the SAO process to the characteristics of processed video data and to achieve better quality. Accordingly, a sample adaptive offset scheme is disclosed herein that can exploit the dynamic characteristics of processed video data.

BRIEF SUMMARY OF THE INVENTION

An apparatus and method for sample adaptive offset (SAO) compensation are disclosed. The method according to the present invention comprises receiving the processed video data, partitioning the processed video data into regions, selecting a SAO type from a group of SAO types for each of the regions, determining a category from a group of categories associated with the SAO type for each of pixels in said each of the regions, determining intensity offset for the category and applying sample adaptive offset compensation to said each of the pixels in the region of the processed video data based on the intensity offset for the category of the SAO type selected. The intensity offset for the category associated with the SAO type is determined according to the pixels belonging to the category in said each of the regions of the processed video data and respective pixels belonging to the category in a respective region of corresponding original video data. The sample adaptive offset compensation can be applied to processed video data corresponding to reconstructed signal, deblocked signal or adaptive loop filtered signal. One aspect of the present invention is related to region partition of the processed video data. The region partition can be performed recursively to further divide a region and the partition can be terminated if the sub-region size is smaller than the CU/LCU size or if the partition depth reaches a maximum predefined, user-defined or image-size-dependent value. In one embodiment, the region partition is CU/LCU aligned. Another aspect of the present invention is related to multiple SAO types for SAO. The SAO types may be a band offset (BO) type, an edge offset (EO) type, or non-processing SAO type. Furthermore, each BO SAO type can be selected from a group of BO types and each EO type can be selected from a group of EO types. Yet another aspect of the present invention is related to syntax to support SAO in a video coding system. A SAO enabling flag is incorporated in sequence level, picture level or slice level to indicate whether the sample adaptive offset compensation is enabled. In one embodiment, the sample adaptive offset information is incorporated in slice header. A split flag is used for each of the regions to indicate whether said each of the regions is split into sub-regions. Furthermore, region partition information is incorporated before intensity offset values.

An alternative apparatus and method for sample adaptive offset (SAO) compensation are also disclosed. The method according to the present invention comprises receiving processed video data, wherein the processed video data correspond to prediction signal for intra/inter prediction, transformed signal, or de-quantized signal, wherein the transformed signal corresponds to transformed prediction residues and the de-quantized signal corresponds to recovered prediction residues by quantizing and de-quantizing the transformed signal. A region for the processed video data is selected and a category for each of pixels in the region of the processed video data based on characteristic measurement of said each of the pixels is determined. According to the pixels in the region of the processed video data and respective pixels in a respective region of associated original video data, the intensity offset for the category is determined. Sample adaptive offset compensation is then applied to the pixels in the region of the processed video data based on the intensity offset for the category. Yet another apparatus and method for sample adaptive offset (SAO) compensation, wherein the decoding of SAO processing is independent of any block outside the enclosing block containing the region, are disclosed.

BRIEF DESCRIPTION OF THE DRAWINGS

FIG. 14 illustrates an exemplary syntax at the sequence level to support the present invention.

FIG. 15 illustrates an exemplary syntax in the slice header to support the present invention.

FIG. 16 illustrates an exemplary syntax for SAO parameters, sao_param( ).

FIG. 17 illustrates an exemplary syntax for SAO split parameters, sao_split_param( ).

FIG. 18 illustrates an exemplary syntax for SAO offset parameters, sao_offset_param( ).

DETAILED DESCRIPTION OF THE INVENTION

Figure 1:
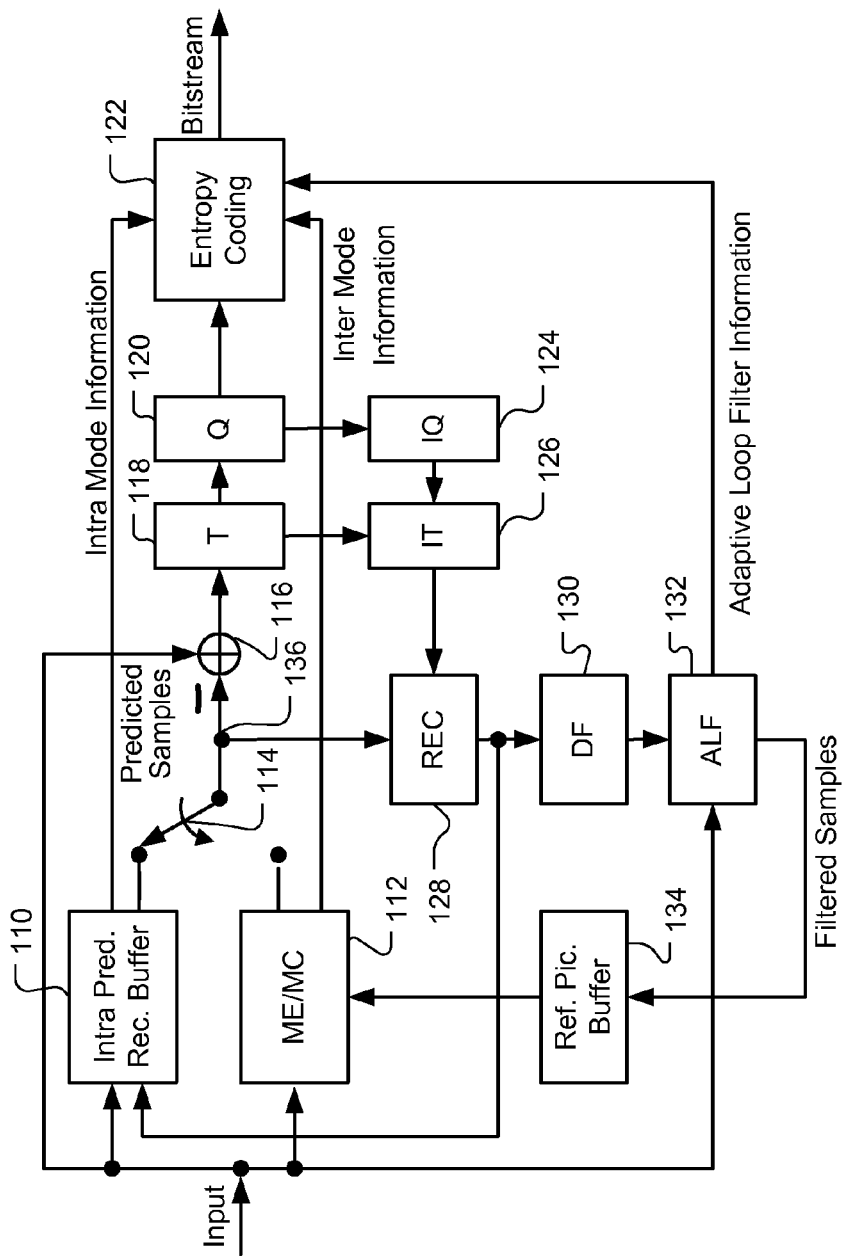
FIG. 1 illustrates a system block diagram of an exemplary video encoder having a reconstruction loop including deblocking filter and adaptive loop filter.

In a video coding system, the video data are subject to various processing such as prediction, transform, quantization, deblocking, and adaptive loop filtering. Along the processing path in the video coding system, certain characteristics of the processed video data may be altered from the original video data due to the operations applied to video data. For example, the mean value of the processed video may be shifted. Intensity shift may cause visual impairment or artifacts, which is especially more noticeable when the intensity shift varies from frame to frame. Therefore, the pixel intensity shift has to be carefully compensated or restored to alleviate the artifacts. There may be various reasons that may cause certain characteristics of the processed video data to be altered. The changes in characteristics of processed video data may be intrinsically related to the operations applied. For example, when a low-pass filter is applied to the video data, pixel values corresponding to a sharp edge will have reduced slope. The pixel value on one side of the edge may be increased and the pixel value on the other side may be decreased. In this example, if sample adaptive offset can take into consideration of the edge characteristics, improved video quality may be achieved. The conventional intensity offset scheme usually classifies each pixel in the processed video data into one of multiple categories according to a context selected. For example, the context may be the pixel intensity of the processed video data. Alternatively, the context may be a combination of a current pixel and its surrounding pixels. A characteristic measurement is derived according to the selected context and a category is determined according to the measured characteristic. For each category, intensity shift between the original pixels and the processed pixels is determined. The intensity shift is also called the "offset value" in this disclosure. Accordingly, the offset value is applied to the processed pixels belonging to the category to compensate the intensity shift. The process of intensity shift compensation or restoration for processed video data based on the category of each pixel is termed "sample adaptive offset (SAO)" in this disclosure.

The conventional SAO scheme often determines the category for the pixels on a frame by frame or slice by slice basis. However, picture contents often are dynamic and the characteristic may vary from frame to frame and/or from region to region within a frame. Therefore, it is desirable to develop a sample adaptive offset scheme that can take into consideration of the dynamic characteristics within a frame using a region partition scheme to adaptively partition the processed video data into regions having different sizes. Furthermore, the conventional SAO scheme always uses a fixed context to determine a category for the pixel of processed video data. For example, the SAO may only use a fixed 16-band band offset (BO) for sample adaptive offset. In another example, the SAO may only used pixels within a 3×3 window as the context to determine the category for the pixel of processed video data. It is desirable that the sample adaptive offset scheme can adaptively select a SAO type from a group of SAO types to tailor the SAO process to the characteristics of processed video data and to achieve better quality. Accordingly, a sample adaptive offset scheme is disclosed herein that can exploit the dynamic characteristics of processed video data.

The exemplary encoder shown in FIG. 1 represents a system using intra/inter-prediction. Intra-prediction 110 is responsible to provide prediction data based on video data in the same picture. For inter-prediction, motion estimation (ME) and motion compensation (MC) 112 is used to provide prediction data based on video data from other picture or pictures. Switch 114 selects intra-prediction or inter-prediction data and the selected prediction data are supplied to adder 116 to form prediction errors, also called residues. The prediction error is then processed by transformation (T) 118 followed by quantization (Q) 120. The transformed and quantized residues are than coded by entropy coding 122 to form a bitstream corresponding to the compressed video data. The bitstream associated with the transform coefficients is then packed with side information such as motion, mode, and other information associated with the image area. The side information may also be subject to entropy coding to reduce required bandwidth. Accordingly the data associated with the side information are provided to entropy coding 122 as shown in FIG. 1. When an inter-prediction mode is used, a reference picture or reference pictures have to be reconstructed at the encoder end. Consequently, the transformed and quantized residues are processed by inverse quantization (IQ) 124 and inverse transformation (IT) 126 to recover the residues. The residues are then added back to prediction data 136 at reconstruction (REC) 128 to reconstruct video data. The reconstructed video data may be stored in reference picture buffer 134 and used for prediction of other frames. Before the reconstructed video data are stored in the reference picture buffer, deblocking filter 130 and adaptive loop filter 132 are applied to the reconstructed video data in order to improve video quality. The adaptive loop filter information may have to be transmitted in the bitstream so that a decoder can properly recover the required information in order to apply the adaptive loop filter. Therefore, adaptive loop filter information from ALF 132 is provided to entropy coding 122 for incorporation into the bitstream. As it is shown in FIG. 1, incoming video data undergo a series of processing in the encoding system. The reconstructed video data from REC 128 may be subject to intensity shift due to the series of processing. The reconstructed video data are further processed by deblocking 130 and adaptive loop filter 132, which may cause further intensity shift. Accordingly, it is desired to incorporate sample adaptive offset to restore or compensate the intensity shift.

Figure 2:
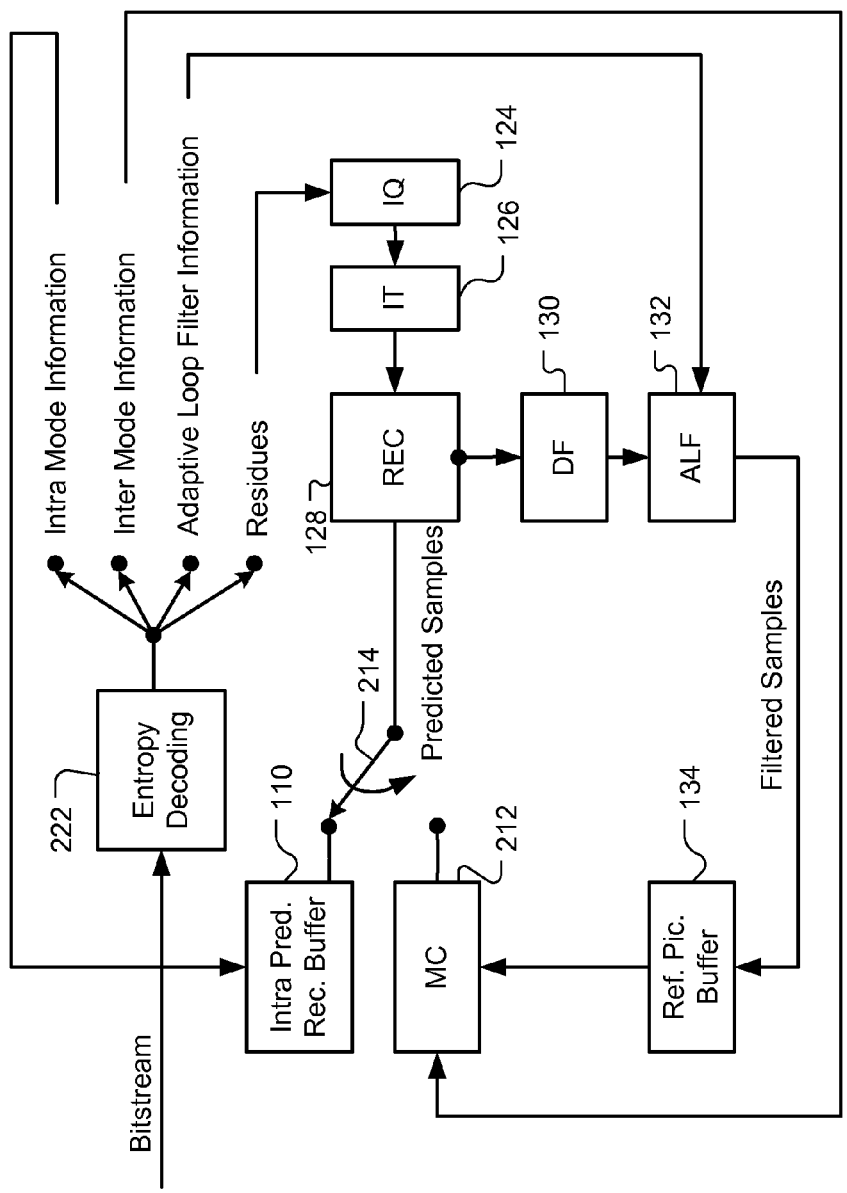
FIG. 2 illustrates a system block diagram of an exemplary video decoder including deblocking filter and adaptive loop filter.

FIG. 2 illustrates a system block diagram of an exemplary video decoder including deblocking filter and adaptive loop filter. Since the encoder also contains a local decoder for reconstructing the video data, some decoder components are already used in the encoder except for the entropy decoder 222. Furthermore, only motion compensation 212 is required for the decoder side. The switch 214 selects intra-prediction or inter-prediction and the selected prediction data are supplied to reconstruction (REC) 128 to be combined with recovered residues. Besides performing entropy decoding on compressed video data, entropy decoding 222 is also responsible for entropy decoding of side information and provides the side information to respective blocks. For example, intra mode information is provided to intra-prediction 110, inter mode information is provided to motion compensation 212, adaptive loop filter information is provided to ALF 132 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to intensity shift. The reconstructed video data are further processed by deblocking filter 130 and adaptive loop filter 132, which may cause further intensity shift. Accordingly, it is desired to incorporate sample adaptive offset to compensate the intensity shift.

Figure 3:
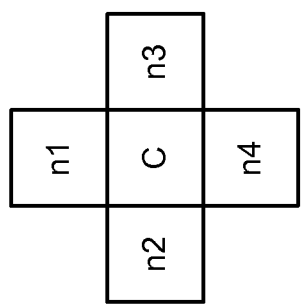
FIG. 3 illustrates an example of adaptive offset based on pixel category, where the category is determined according to pixel C and its neighboring pixels n1-n4.

In order to overcome the offset problems, McCann et al. disclosed a content adaptive extreme correction and band correction in "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, Del., 15-23 April, 2010. The use of content information based on neighboring pixels can explore local edge characteristics and may result in improved performance in terms of better visual quality or bit rate reduction. McCann et al. disclosed a neighboring pixel configuration as shown in FIG. 3, where C is the current pixel value and n1 through n4 are four neighboring pixels on the top, left, right and bottom sides of the current pixel respectively. The method to classify pixels into seven categories according to McCann et al. is shown in Table 1:

TABLE 1

| Category | Condition | Note |
| --- | --- | --- |
| 0 | C < 4 neighbors | Local min |
| 1 | C < 3 neighbors && C = $4^{th}$ neighbor | Object edge |
| 2 | C < 3 neighbors && C > $4^{th}$ neighbor | Object edge |
| 3 | C < 3 neighbors && C < $4^{th}$ neighbor | Object edge |
| 4 | C < 3 neighbors && C = $4^{th}$ neighbor | Object edge |
| 5 | C > 4 neighbors | Local max |
| 6 | None of the above | Other |

For category 0, the pixel C is a local minimum, also called a valley. For category 5, the pixel C is a local maximum, also called a peak. For categories 1, 2, 3 and 4, the pixel C is at an object edge. For pixels in each category, the difference between the mean of processed video data and the mean of original video data is computed and transmitted to the decoder. The processed video data can be the reconstructed video data from REC 128, the deblocked data from DF 130 or the adaptive loop filtered data from ALF 132. McCann et al. classify the edge characteristics into "categories", which are also termed as "classes". While FIG. 1 and FIG. 2 illustrate exemplary systems that sample adaptive offset for video coding can be applied, other systems may also embody the present invention to overcome the intensity shift issue. For example, in the camera image processing system, video data processed by demosaicing, white balancing, and/or edge enhancement may also be subject to intensity shift. As disclosed above, McCann et al. apply a first intensity offset to restore processed data between DF 130 and ALF 132 according to edge characteristic of underlying pixel. The adaptive offset based on the edge characteristic of underlying pixel is termed as Extreme Correction (EXC) by McCann et al.

According to McCann et al., the above extreme correction is applied to reconstructed video data. The reconstructed mean intensity value Vr(c) corresponding to class c and the original mean intensity value Vo(c) corresponding to class c are determined for a video picture. The offset Vd(c) corresponding to class c can be determined according to:

$$Vd(c)=Vo(c)-Vr(c).$$

The offset Vd(c) as computed above is added to the reconstructed video data belonging to class c, i.e., Vr'(c)=Vr(c)+Vd(c), where Vr'(c) is the offset corrected video data. In order for a decoder to apply the proper offset for respective classes, the offset Vd(c) values for all classes have to be transmitted to the decoder. Proper bitstream syntax will be needed to incorporate the offset Vd(c) values.

Figure 4:
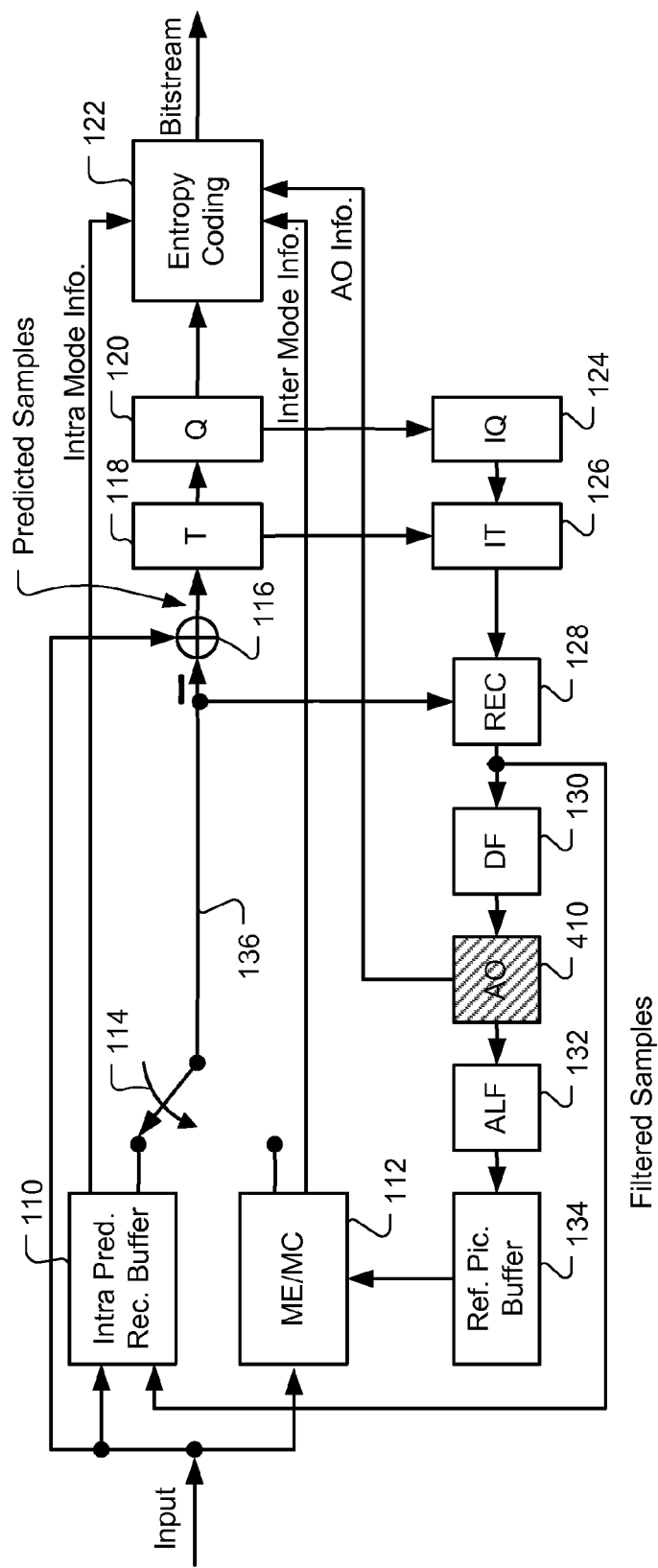
FIG. 4 illustrates an exemplary system block diagram of a video encoder where sample adaptive offset is applied to video data after deblocking filter.
Figure 5:
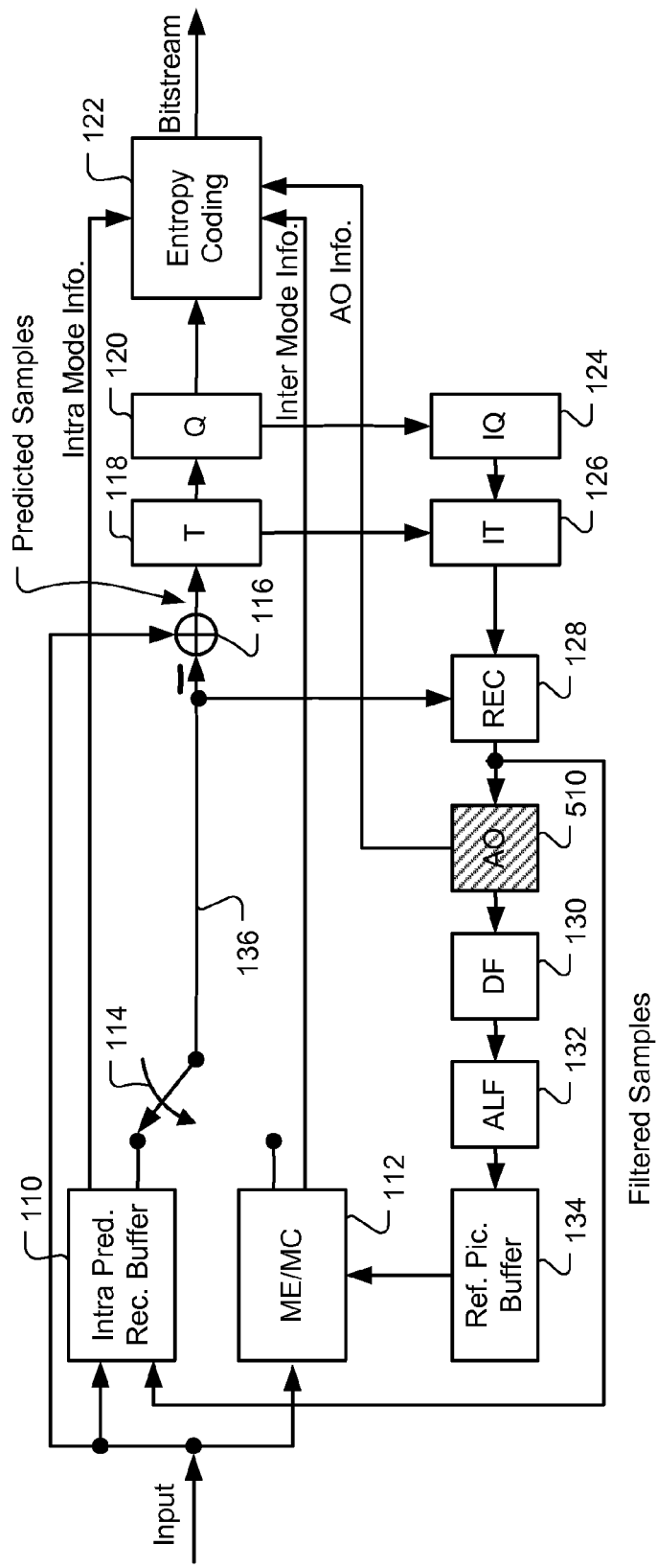
FIG. 5 illustrates an exemplary system block diagram of a video encoder where sample adaptive offset is applied to video data after reconstruction.

The Adaptive Offset 410 based on EXC according to McCann et al., is applied to video data between DF 130 and ALF 132, as shown in FIG. 4. McCann et al. disclosed another adaptive offset correction according to the band that an underlying pixel belongs to. This method is also termed as band correction (BDC). According to McCann et al., the main motivation of band-based classification is to equalize two different Probability Density Functions (PDFs) of underlying data corresponding to the reconstructed video data and the original video data. McCann et al. disclosed a band-based classification by using the p most significant bits of the pixels, which is equivalent to dividing the intensity into $2^p$ classes having uniform intervals. In one implementation, McCann et al. selected p=4 to divide the intensity into 16 equally spaced bands, also termed as classes. For each band or class, the mean difference is computed and transmitted to the decoder and the offset can be corrected individually for each band. The reconstructed mean intensity value Vr(c) corresponding to band c or class c and the original mean intensity value Vo(c) corresponding to band c or class c are determined for a video picture. The same mathematical symbols Vr(c) and Vo(c) for EXC have been used for convenience. As in the adaptive offset correction based on edge characteristics, the offset Vd(c) associated corresponding to class c can be determined according to Vd(c)=Vo(c)−Vr(c). The offset Vd(c) as computed above is then added to the reconstructed video data belonging to class c, i.e., Vr'(c)=Vr(c)+Vd(c), where Vr'(c) is the offset corrected video data. McCann et al. apply band correction to processed video data between ALF 132 and reference picture buffer 134 (not shown). While McCann et al. apply AO either between DF 130 and ALF 132, or between ALF 132 and Reference Picture Buffer 134, AO 510 may also be applied between REC 128 and DF 130 as shown in FIG. 5.

Figure 6:
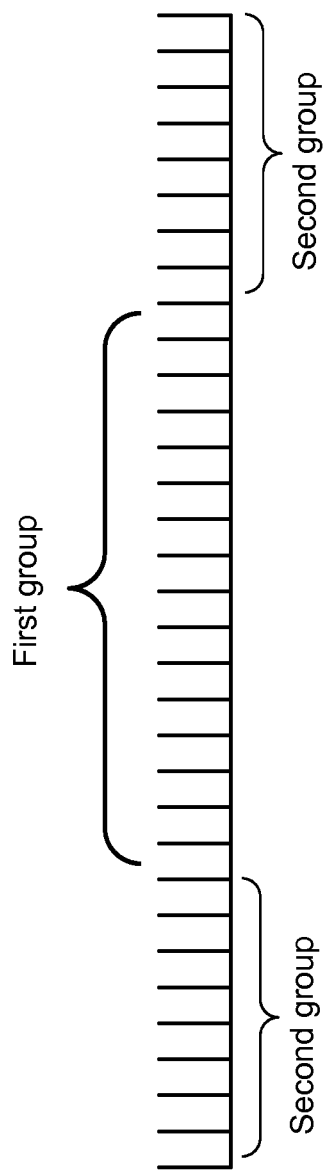
FIG. 6 illustrates an example of two SAO types based on band offset (BO), where the first type consists of central bands and the second type consists of side bands.

In additional to 16 uniform bands for band classification, 32 uniform bands for band classification to increase the possibility of nonzero are described in "CE8 Subset3: Picture Quadtree Adaptive Offset", Document: JCTVC-D122, Joint Collaborative Team on Video Coding (JCT-VC) of ITU-T SG16 WP3 and ISO/IEC JTC1/SC29/WG11, 4th Meeting: Daegu, KR, 20-28 Jan., 2011, and in "CE13: Sample Adaptive Offset with LCU-Independent Decoding", Document: JCTVC-E049, Joint Collaborative Team on Video Coding (JCT-VC) of ITU-T SG16 WP3 and ISO/IEC JTC1/SC29/WG11, 5th Meeting: Geneva, CH, 16-23 Mar., 2011, and in U.S. Non-Provisional patent application Ser. No. 12/987,151, entitled "Apparatus and Method of Adaptive Offset for Video Coding", filed on Jan. 9, 2011. In order to reduce side information (from 32 offsets to 16), the 32 uniform bands are divided into two groups as shown in FIG. 6. The 16 bands in the center are assigned to group 1 and the 16 bands on both sides are assigned to group 2. Accordingly, one set of offsets is sent for the center 16 bands (group 1), and one set of offsets is sent for the outer 16 bands (group 2).

While McCann et al. disclosed adaptive processing related to edge characteristics of an underlying pixel and the pixel classification is based on a whole picture, an alternative edge based adaptive offset is disclosed in the co-pending U.S. patent application Ser. No. 12/987,151, entitled "Apparatus and Method of Adaptive Offset for Video Coding", filed Jan. 9, 2011, where simplified linear pixel configurations using two neighboring pixels are used. The use of simplified pixel configuration will reduce the required computation. Accordingly, four simplified pixel configurations, also called pixel patterns, are disclosed as shown in FIGS. 7A-7D corresponding to vertical line (90-degree), horizontal line (0-degree), 135-degree line and 45-degree line respectively. Each pixel configuration arranged as a short line is responsive to intensity transition along the line. For example, a horizontal edge will cause a more noticeable intensity transition in the vertical line than lines having other orientations. Similarly, a vertical edge will cause more noticeable intensity transition in the horizontal line than lines having other orientation. The selection of pixel configuration can be determined on a region by region basis and a flag is required for each region. Based on the pixel configuration, an underlying pixel is classified into 6 classes corresponding to edges, peak, valley and none of the above as shown in Table 2:

TABLE 2

| Category | Condition | Note |
|---|---|---|
| 0 | C < 2 neighbors | Local min |
| 1 | C < 1 neighbor && C = 1 neighbor | Edge |
| 2 | C > 1 neighbor && C < 1 neighbor | Edge |
| 3 | C > 1 neighbor && C = 1 neighbor | Edge |
| 4 | C > 2 neighbors | Local max |
| 5 | None of the above | Other |

While the SAO schemes mentioned above utilize either the band offset (BO) context or the edge offset (EO) context to classify pixels into categories, an embodiment according to the present invention utilizes multiple SAO types. For example, the multiple SAO types may include both the BO context and EO context. Each SAO type has an associated number of categories. For example, 16 categories (i.e., 16 bands) are associated with group 1 BO and group 2 BO in the above example. 6 categories are associated with each of the four EO configurations or contexts. The number of categories mentioned in the above example is intended for illustration purpose and shall not be construed as limitation to the present invention. The total number of SAO types according to the present invention can be pre-defined or user defined. Furthermore, the number of categories for each SAO type can be pre-defined, user defined, or image size dependent. When multiple SAO types are used, a syntax element sao_type_idx may be used to identify the SAO type selected. Table 3 illustrates an example of multiple SAO types including both the BO context and the EO context.

TABLE 3

| sao_type_idx | sample adaptive offset type to be used | Number of categories, nSaoLength [sao_type_idx] |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | central bands band offset | 16 |
| 6 | side bands band offset | 16 |

Figure 8:
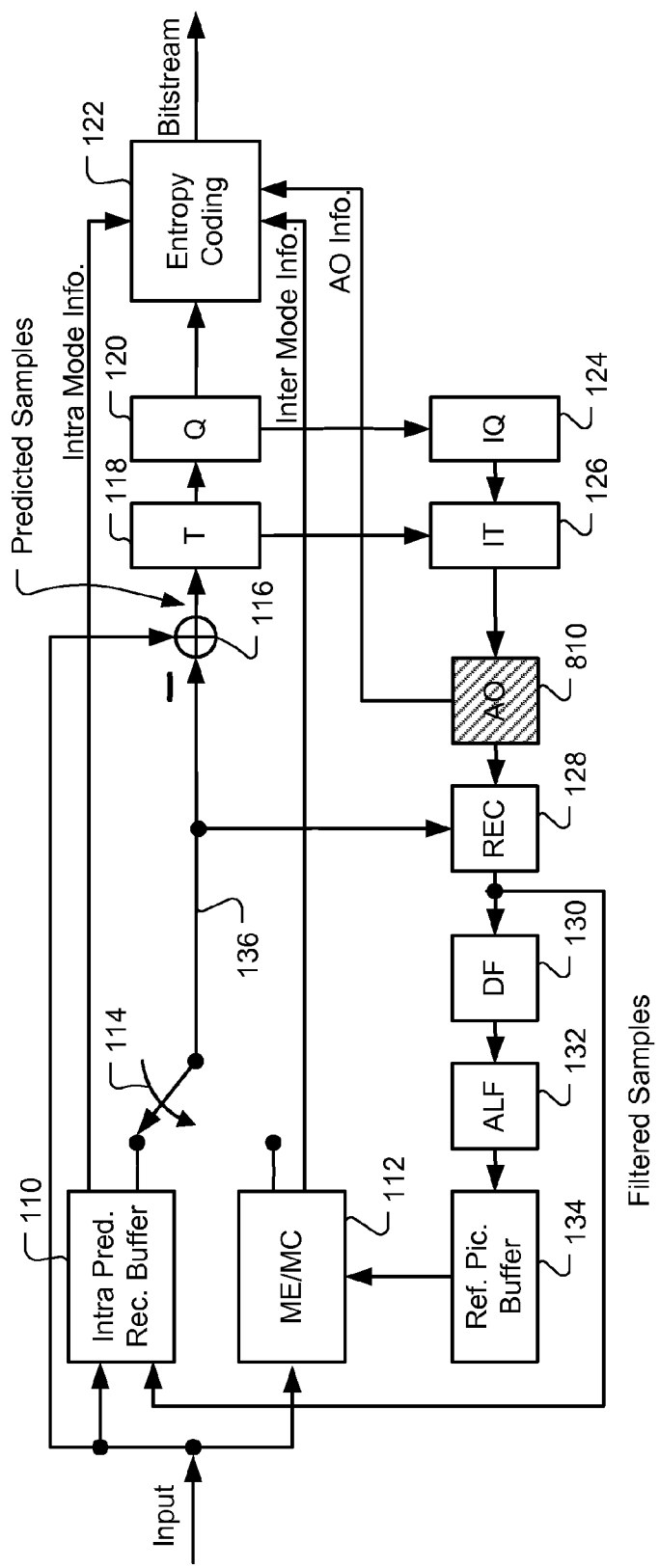
FIG. 8 illustrates a system block diagram of a video encoder wherein sample adaptive offset is applied to video data after inverse transform.
Figure 9:
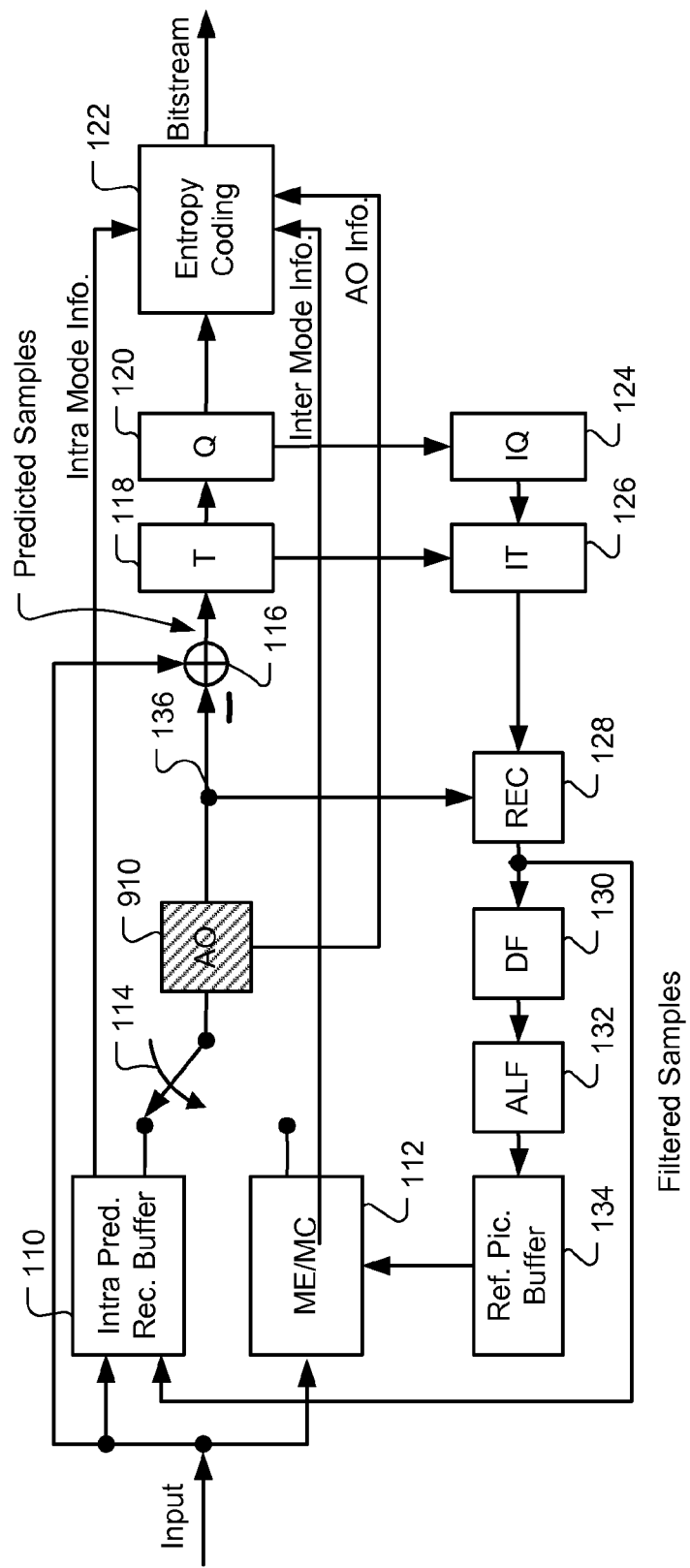
FIG. 9 illustrates an exemplary system block diagram of a video encoder where sample adaptive offset is applied to the prediction signal.
Figure 10:
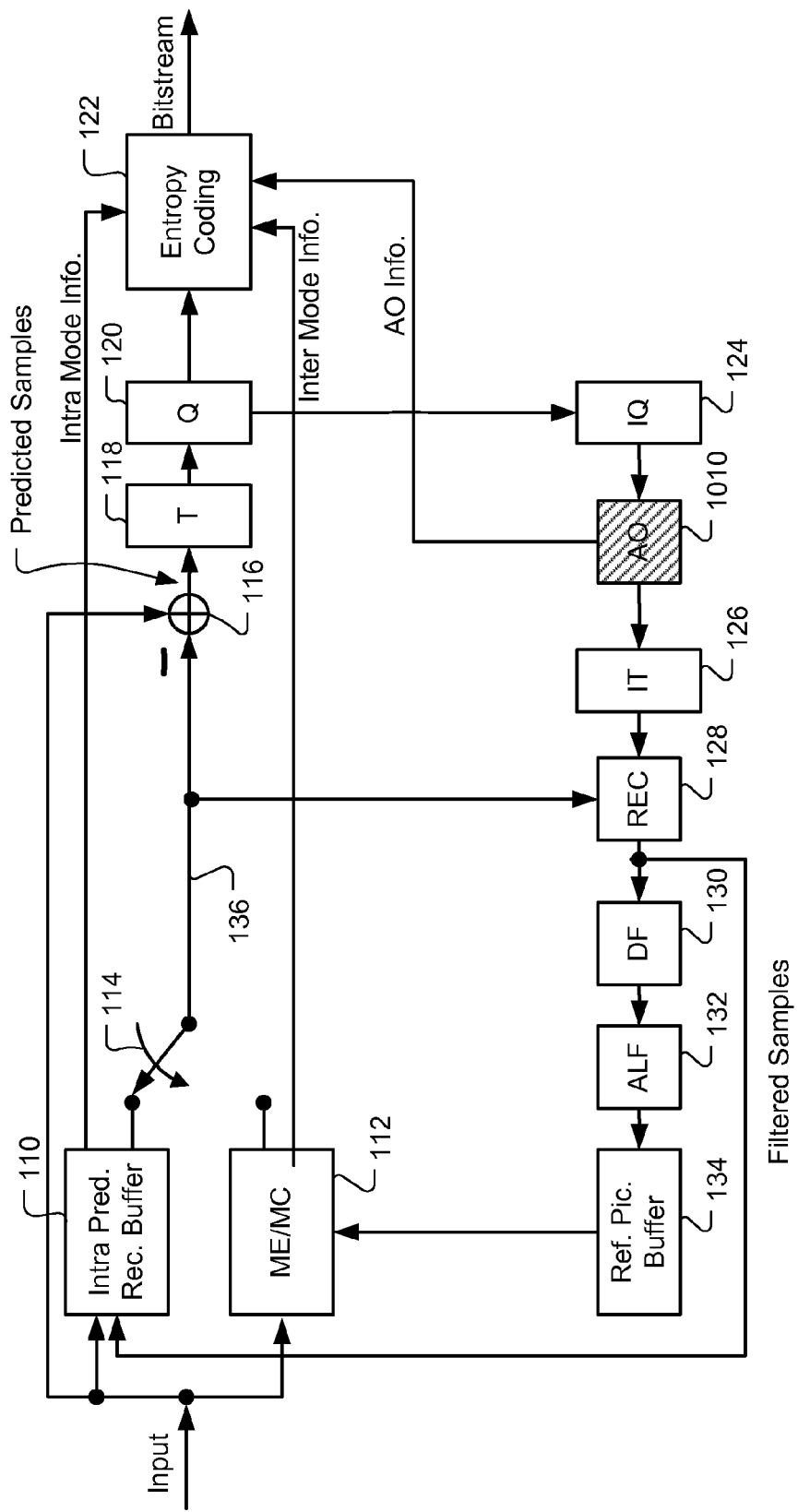
FIG. 10 illustrates an exemplary system block diagram of a video encoder where sample adaptive offset is applied to the de-quantized signal.

While sample adaptive offset has been always applied to the video signal after reconstruction to restore the video signal, sample adaptive offset may also be applied to the video signal before reconstruction. For example, sample adaptive offset 810 may be applied to inverse transformed residual signal before reconstruction (REC) 128 as shown in FIG. 8. The recovered residual signal at the output of inverse transform (IT) 126 has been processed by transform 118, quantization 120, de-quantization 124 and inverse transform 126. Therefore, the residual signal may be subject to intensity shift and adaptive offset will be useful to restore the intensity shift. Side information associated with adaptive offset may be entropy coded and incorporated into the bitstream. In another example, sample adaptive offset is applied to the intra/inter predictor before the predictor is subtracted from the original video signal as shown in FIG. 9. The predictor derived according to either Intra or Inter prediction is subject to various operations which may cause intensity shift. Therefore, sample adaptive offset will be useful to restore the intensity shift. In yet another example, sample adaptive offset 1010 may be applied to video signal between de-quantization 124 and inverse transformation 126 as shown in FIG. 10.

Figure 11:
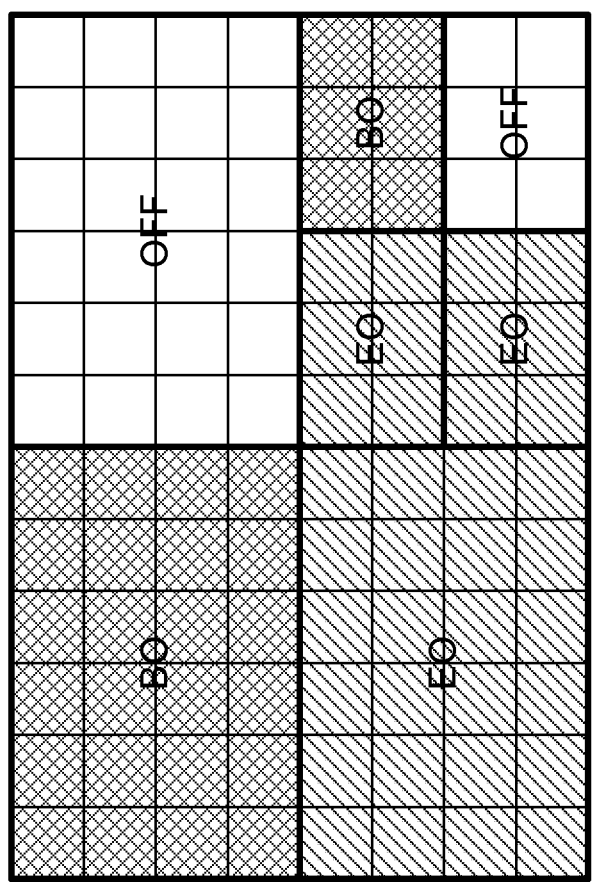
FIG. 11 illustrates an example of recursive region partition, wherein a SAO type is selected for each region.

In the method by McCann el al., the AO is always based on a whole frame or a group of pictures. For some video data, a region corresponding to a smaller picture area may be more advantageous for adaptive processing because the category associated with a smaller picture area may closely characterize the underlying video data in the region. Accordingly, a multi-level region partition is used in the present invention. Each region can be recursively divided into four sub-regions using a quadtree. Information related to the region partition can be conveyed using syntax. The region boundaries can be aligned with the coding unit (CU) or with the largest coding unit (LCU). Each region can select one of the sample adaptive offset (SAO) types such as 2 types of band offset (BO), 4 types of edge offset (EO) and no processing (OFF) as shown in the above table. FIG. 11 illustrates an example of picture partitioned into regions and each region is processed by SAO using BO, EO or OFF type. Each small block in FIG. 11 represents a LCU.

Figure 12:
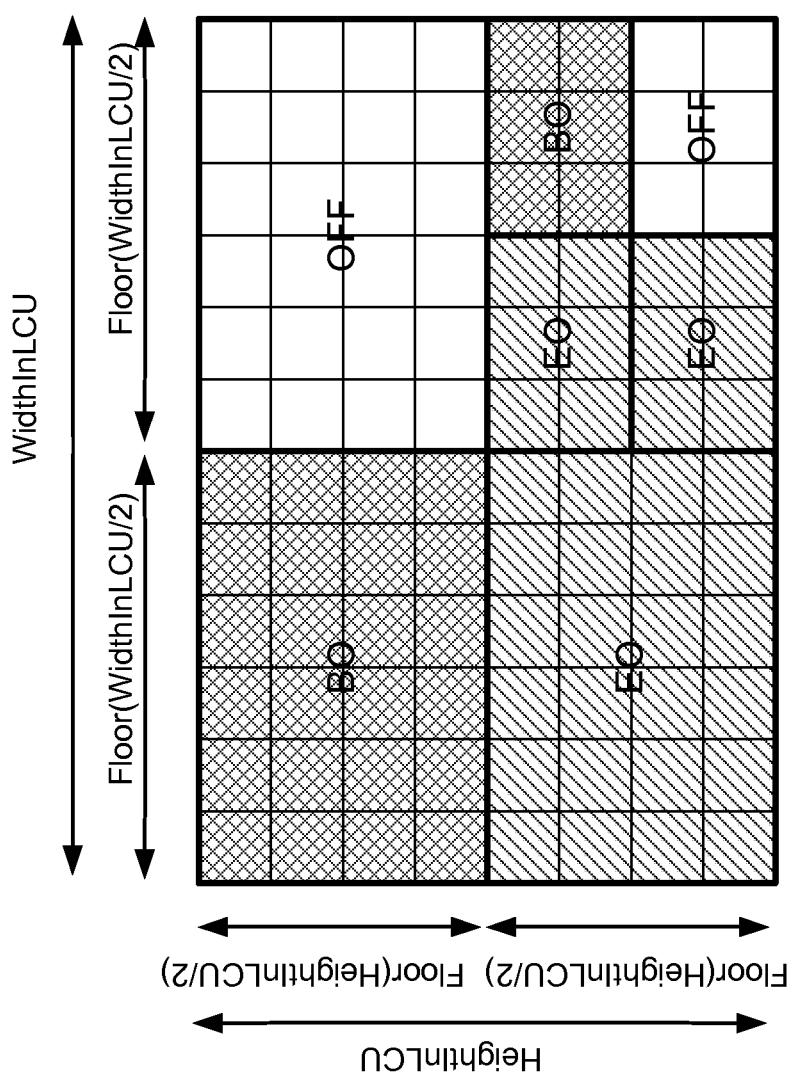
FIG. 12 illustrates an example of recursive region partition by dividing a region into four sub-regions having roughly the same number of LCUs horizontally and vertically.

Region partition for SAO can be block based. The number of depths in quadtree partition is depending on the block size. If either the region width or region height is smaller than the block size, the splitting process for the current region will be terminated. The maximum quadtree depth can be user-defined depth, pre-defined depth, or image size. The block size can be smaller than, equal to, or larger than the LCU size. An example of LCU aligned region partitioning is shown in FIG. 12. The region is measured by LCU size. WidthInLCU is the number of LCUs for the width of the current region and HeightInLCU is the number of LCUs for the height of the current region. The partition in the horizontal direction divides WidthInLCU into two sub-regions having widths Floor(WidthInLCU/2) and WidthInLCU−Floor(WidthInLCU/2), where Floor(x) is the floor function. Similarly, the partition in the vertical direction divides HeightInLCU into two sub-regions having widths Floor(HeightInLCU/2) and HeightInLCU−Floor(HeightInLCU/2).

Figure 7D:
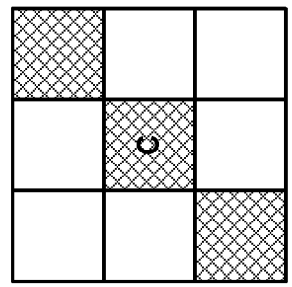
FIGS. 7A-D illustrate four linear configurations of a current pixel and its neighboring pixels for pixel category determination.
Figure 7C:
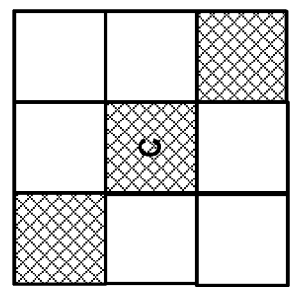
Figure 7B:
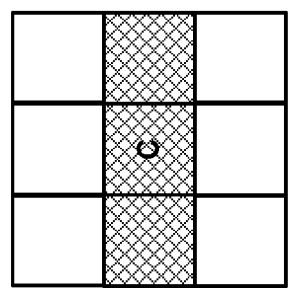
Figure 7A:
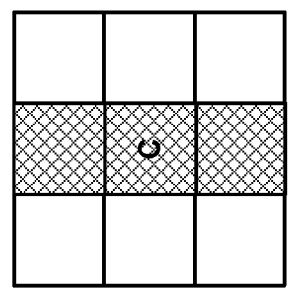
Figure 13A:
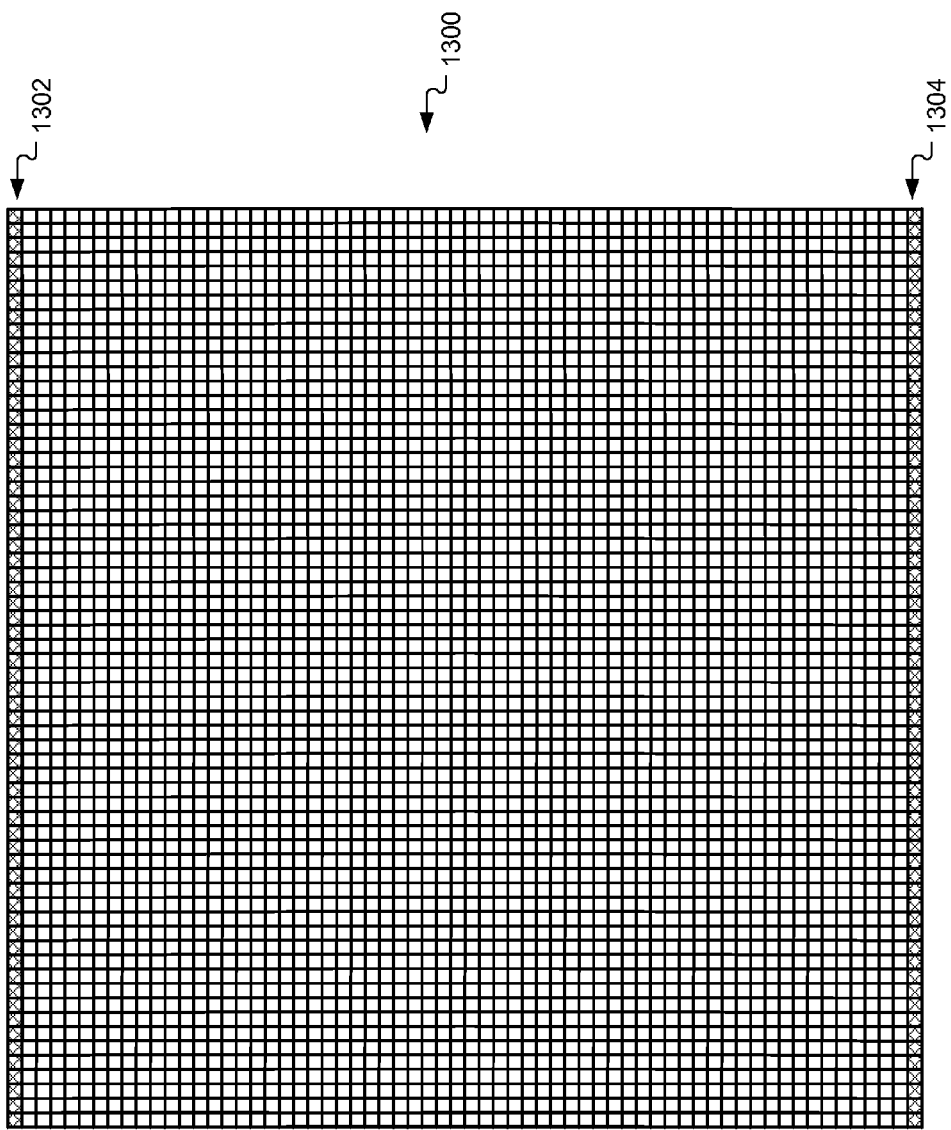
FIG. 13A illustrates an example of skipping SAO compensation for the first row and the last row of pixels in an LCU when the 45-degree, 90-degree, or 135-degree EO pattern is used.

Some types of AO classification may rely on neighboring pixels, such as the EO based SAO where the category determination may depend on the 3×3 window around the current pixel. Therefore, the determination of SAO category for pixels at the boundaries of LCU may rely on pixels from neighboring LCUs. The dependency may prevent parallel processing of multiple LCUs and also may require large buffer memory to accommodate the dependency on neighboring LCUs. It is desirable to develop a method to eliminate the dependency on neighboring LCUs. An embodiment according to the present invention provides block-independent SAO processing by skipping or bypassing SAO processing for those pixels adjacent to the block boundaries that depend on other blocks. Depending on the SAO design, boundary pixels relying on neighboring block(s) for SAO determination may include pixels immediately adjacent to the boundaries or with distance more than one pixel from the boundaries. For example, if the 90-degree EO of FIG. 7A is used, the first row and the last row of pixels of the block (an LCU consisting of 64×64 pixels in this example) will depend on neighboring blocks above and below for SAO determination as shown in FIG. 13A. Accordingly, SAO processing will skip the first row 1302 and the last row 1304 of the block so that SAO will become block independent. The first row 1302 and the last row 1304 will also depend on neighboring block(s) for SAO determination if the 45-degree or 135-degree OE of is used. Accordingly, SAO processing will skip the first row 1302 and the last row 1304 of the block so that SAO will become block independent if 45-degree or 135-degree EO is used. Similarly, the first column and the last column of the block will be skipped for SAO processing if the 0-degree, 45-degree or 135-degree EO is used. FIG. 13A illustrates an example of skipping SAO compensation for the first row and the last row of pixels in an LCU when the 45-degree, 90-degree, or 135-degree EO pattern is used. Similarly, the SAO compensation can be skipped for the first column and the last column of pixels in an LCU when the 0-degree, 45-degree, or 135-degree EO pattern is used. In this way, SAO decoding of each LCU does not require any pixel from any other LCU, and LCU-independent decoding or LCU-parallel decoding can be achieved. In addition to skipping SAO compensation at LCU boundaries for particular EO patterns, padding techniques can also be used to replace any pixel from any other LCUs to achieve LCU-independent decoding. Examples of padding techniques are repetitive padding or mirror-based padding. Padding techniques can be horizontal padding first or vertical padding first. Another benefit of this "block-independent decoding" scheme is that the decoder line buffer with size proportional to the picture width can be eliminated when SAO decoding is done block by block where the block size can be smaller than, equal to, or larger than the LCU size. Another modification to the block-independent decoding scheme is to use variable blocks instead of fixed blocks. For example, skipping SAO compensation or padding at leaf CU boundaries can be applied to achieve leaf-CU-independent decoding. Another extension of the block-independent decoding is called "decoding with causal blocks only" wherein SAO decoding is done block by block and decoding of each block does not require any data from future blocks. For example, when the block processing order is raster scan, pixels from right and below blocks cannot be utilized. Skipping or padding may be used for pixels on the last row or column. Similarly, the blocks can be LCUs, leaf CUs, LCU rows with the width as wide as the picture, or of any other size.

Figure 13B:
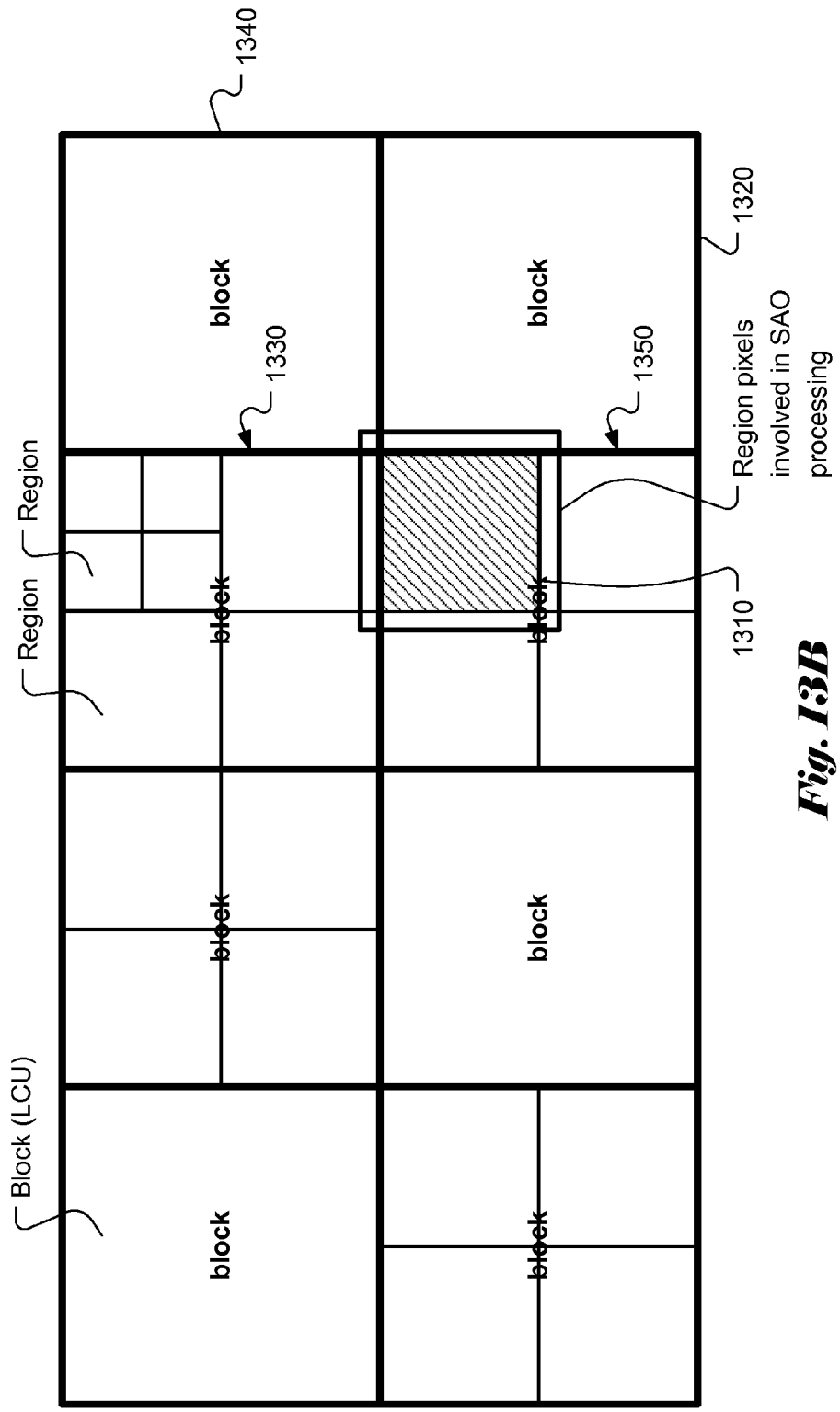
FIG. 13B illustrates an example of region partition aligned with block boundaries, where the block is selected to be LCU.

FIG. 13B illustrates an example of region partition aligned with block boundaries, where the block is selected to be the LCU. The image is divided into non-overlapping blocks as shown in FIG. 13B. The SAO region partition using quadtree partitions the video data into regions, where the partition is aligned with block boundaries (i.e., LCU boundaries in this example). The category determination for some regions may depend on pixels of neighboring blocks (LCUs). For example, the region 1310 may be dependent on pixels from other blocks such as LCU 1320 on the right, LCU 1330 on the top and LCU 1340 on the upper right for SAO determination. The region 1310 is enclosed by block 1350, where region boundaries of region 1310 on the top and on the right belong to block boundaries of block 1350 on the top and on the right respectively. Region boundaries of region 1310 on the left and on the bottom are inside the enclosing block 1350. SAO determination for region boundaries of region 1310 on the left and on the bottom (except for the first top pixel of the left boundary and the first right pixel of the bottom boundary) does not rely on pixels from neighboring blocks.

The SAO region partition information has to be conveyed to the decoder side so that the partition structure and AO parameters can be recovered. An exemplary syntax structure to support SAO region partition is shown in FIGS. 14-18. FIG. 14 illustrates exemplary syntax at the sequence level where the syntax element sample_adaptive_offset_enabled_flag is included in the sequence parameter set, i.e., SPS header. The syntax element sample_adaptive_offset_enabled_flag indicates whether SAO is enabled in the sequence. The SAO enable flag may also be incorporated in the picture level or slice level. FIG. 15 illustrates new syntax element included in the slice header. If the SAO enabled flag, i.e., sample_adaptive_offset_enabled_flag, has a value of 1, the SAO parameter set, sao_param( ), is included in the slice header. An exemplary SAO parameter set, sao_param( ) is show in FIG. 16, where sample_adaptive_offset_flag specifies whether SAO is applied or not to the current slice. If the flag has a value of 1, the parameter set also includes sao_split_param(0, 0, 0) and sao_offset_param(0, 0, 0) to convey information related to quadtree region partition and offset information. As noted in FIG. 16, the SAO partition information (i.e., sao_split_param(0, 0, 0)) is located in the bitstream before the SAO offset values (i.e., sao_offset_param(0, 0, 0)).

Exemplary syntax for sao_split_param(xs, ys, sao_curr_depth) is illustrated in FIG. 17, which shows the recursive SAO split structure. The condition sao_curr_depth<SaoMaxDepth is checked to see whether the current SAO depth reaches the maximum SAO depth, SaoMaxDepth. If the condition is satisfied, further split as indicated by sao_split_flag [sao_curr_depth] [ys][xs] is performed; otherwise the split is terminated. Exemplary syntax for sao_offset_param(xs, ys, sao_curr_depth) is illustrated in FIG. 18. If the SAO split flag indicates that the region is split, four SAO offset parameter sets for the next depth are included. If the SAO region is not further split, an syntax element sao_type_idx [sao_curr_depth][ys][xs] is included to indicate the offset type to be applied in (ys*2+xs)-th region of sao_curr_depth-th depth of current slice. The sao_type_idx value is defined in Table 3. When sao_type_idx has a value of 0, no SAO is applied. When sao_type_idx has a value from 1 to 4, EO-type SAO is applied. When sao_type_idx has a value 5 or 6, BO-type SAO is applied. For each sao_type_idx, respective SAO offset values, i.e., sao_offset [sao_curr_depth] [ys][xs][i] are incorporated.

According to the syntax structure disclosed in FIGS. 14-18, a decoder embodying SAO according to the present invention is enabled to derive the SAO partition and corresponding SAO offset values to perform sample offset restoration. For example, by checking whether SAO is enabled, as indicated by sample_adaptive_offset_enabled_flag in the SPS, the decoder may extract sao_param( ) in the slice header if SAO is enabled. The sample_adaptive_offset_flag in sao_param( ) specifies whether SAO is applied or not to the current slice. If SAO is applied to the current slice, the decoder will further extract sao_split_param(0, 0, 0) and sao_offset_param(0, 0, 0) in sao_param( ). From sao_split_param(0, 0, 0), the decoder will be able to derive the SAO region partition information. Furthermore, the SAO offset values for corresponding regions may be derived from sao_offset_param(0, 0, 0). Accordingly, all the necessary SAO information can be derived according to the syntax structure described above. The syntax design example shown in FIGS. 14-18 is for the purpose of illustration. A skilled person in the field may modify the syntax to practice sample adaptive offset without departing from the spirit of the present invention.

Embodiment of sample adaptive offset compensation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for decoding of a video bitstream generated by a video coding system with sample adaptive offset (SAO), the method comprising:
   receiving video bitstream;
   deriving processed video data from the video bitstream;
   parsing a first syntax element associated with region partition information from the video bitstream at a location of the video bitstream before a second syntax element for intensity offset values;
   configuring the processed video data into regions according to the region partition information, wherein each of the regions is smaller than a picture;
   deriving a region-based SAO type from the video bitstream for each of the regions, wherein the region-based SAO type is allowed to vary from one region to another region;
   determining a category from a group of categories associated with the region-based SAO type for each of pixels in said each of the regions, wherein the category for a current pixel is determined based on the current pixel and at least two neighboring pixels;
   deriving intensity offset from the video bitstream for the category associated with the region-based SAO type; and
   applying sample adaptive offset compensation to said each of the pixels in the region of the processed video data based on the intensity offset for the category of the region-based SAO type selected.

2. The method of claim 1, wherein said partitioning the processed video data into the regions is performed recursively.

3. The method of claim 1, wherein said partitioning the processed video data into the regions is boundary aligned with block boundaries of non-overlapping blocks, wherein the non-overlapping blocks can be largest coding units (LCUs), smallest coding units (SCUs), or any other fixed-size or non-fixed-size blocks, and wherein region boundaries for each of the region either belong to block boundaries of an enclosing non-overlapping block or are within the enclosing non-overlapping block.

4. The method of claim 1, wherein the region-based SAO type is selected from a group of SAO types and wherein the group of SAO types comprises multiple band offset (BO) types, multiple edge offset (EO) types, and a non-processing type.

5. The method of claim 1, wherein a total category number associated with each of multiple band offset (BO) types and each of multiple edge offset (EO) types is user defined, pre-defined, or adaptively changed.

6. The method of claim 1, wherein a value corresponding to the intensity offset for the category associated with the region-based SAO type has a precision related to pixel bit depth of the processed video data.

7. The method of claim 1, wherein sample adaptive offset information is derived from the video bitstream in slice header.

8. The method of claim 1, wherein different region-based SAO types are derived from the video bitstream at different levels including sequence level, picture level and slice level.

9. The method of claim 1, wherein a split flag is derived from the video bitstream to indicate whether said each of the regions is split into sub-regions.

10. A method for sample adaptive offset (SAO) compensation of processed video data, the method comprising:
receiving the processed video data;
configuring the processed video data into regions according to region partition information, wherein each of the regions is smaller than a picture;
selecting a region-based SAO type from a group of SAO types for each of the regions, wherein the region-based SAO type is allowed to vary from one region to another region;
determining a category from a group of categories associated with the region-based SAO type for each of pixels in said each of the regions, wherein the category for a current pixel is determined based on the current pixel and at least two neighboring pixels;
determining intensity offset for the category associated with the region-based SAO type according to the pixels belonging to the category in said each of the regions of the processed video data and respective pixels belonging to the category in a respective region of corresponding original video data; and
applying sample adaptive offset compensation to said each of the pixels in the region of the processed video data based on the intensity offset for the category of the region-based SAO type selected; and
signaling a first syntax element associated with the region partition information in a video bitstream at a location of the video bitstream before a second syntax element for intensity offset values.

11. The method of claim 10, wherein said partitioning the processed video data into the regions is performed recursively.

12. The method of claim 10, wherein said partitioning the processed video data into the regions is boundary aligned with block boundaries of non-overlapping blocks, wherein the non-overlapping blocks can be largest coding units (LCUs), smallest coding units (SCUs), or any other fixed-size or non-fixed-size blocks, and wherein region boundaries for each of the region either belong to block boundaries of an enclosing non-overlapping block or are within the enclosing non-overlapping block.

13. The method of claim 10, wherein the group of SAO types comprises multiple band offset (BO) types, multiple edge offset (EO) types, and a non-processing type.

14. The method of claim 10, wherein a total category number associated with each of multiple band offset (BO) types and each of multiple edge offset (EO) types is user defined, pre-defined, or adaptively changed.

15. The method of claim 10, wherein a value corresponding to the intensity offset for the category associated with the region-based SAO type has a precision related to pixel bit depth of the processed video data.

* * * * *